(12) United States Patent  
Vincent et al.

(10) Patent No.: US 9,134,410 B2  
(45) Date of Patent: Sep. 15, 2015

(54) METHOD AND DEVICE FOR DETECTING A TARGET BY MASKED HIGH ENERGY REFLECTORS

(75) Inventors: François Vincent, Toulouse (FR); Philippe Goy, Toulouse (FR)

(73) Assignee: Rockwell Collins France, Blagnac (FR)

( * ) Notice: Subject to any disclaimer, the term of this patent is extended or adjusted under 35 U.S.C. 154(b) by 278 days.

(21) Appl. No.: 13/542,614

(22) Filed: Jul. 5, 2012

(65) Prior Publication Data

US 2013/0176162 A1 Jul. 11, 2013

(30) Foreign Application Priority Data

Jul. 6, 2011 (FR) .................................... 11 56126

(51) Int. Cl.
*G01S 13/58* (2006.01)
*G01S 13/52* (2006.01)
(Continued)

(52) U.S. Cl.
CPC ............... *G01S 13/589* (2013.01); *G01S 7/414* (2013.01); *G01S 13/50* (2013.01); *G01S 13/536* (2013.01); *G01S 13/93* (2013.01); *G01S 13/9303* (2013.01); *G01S 13/94* (2013.01)

(58) Field of Classification Search
CPC ............. G01S 7/02; G01S 7/41; G01S 7/414; G01S 7/418; G01S 13/006; G01S 13/02; G01S 13/50; G01S 13/52; G01S 13/536; G01S 13/58; G01S 13/589; G01S 13/88; G01S 13/93; G01S 13/9303; G01S 13/94
USPC ......... 244/3.1, 3.15, 3.16; 342/13, 14, 16, 17, 342/25 R–26 D, 27, 28, 59, 89–115, 118, 342/127, 128–133, 145–147, 159–164, 175, 342/192–197, 70–72
See application file for complete search history.

(56) References Cited

U.S. PATENT DOCUMENTS 3,614,786 A * 10/1971 Goggins, Jr. .................. 342/104
3,713,144 A * 1/1973 Letten et al. .................. 342/159
(Continued)

FOREIGN PATENT DOCUMENTS

EP 2 320 247 5/2011

OTHER PUBLICATIONS

Dong, Yunhan, "L-Band VV Clutter Analysis for Natural Land", Radar Conference, 2003. Proceedings of the International Adelaide, SA, Australia, Sep. 3-5, 2003, Piscataway, NJ, USA, pp. 625-630.
(Continued)

*Primary Examiner* — Bernarr Gregory
(74) *Attorney, Agent, or Firm* — Foley & Lardner LLP

(57) ABSTRACT

Methods and devices for detecting, in a scene, a first type reflector is provided. The method includes identifying, using a radar in a mobile system, a zone of a distance-radial velocity space that contains a second type reflector. The second type reflector is capable of concealing the first type reflector. The method includes modeling an order two phase shift over time of theoretical first type and second type reflectors. The method includes creating a filter a distance and a radial velocity. The method includes illuminating the scene. The method includes acquiring raw radar data from the echoes reflected by the reflectors of the scene. The method includes obtaining distance profiles. The method includes applying a filter on the distance profiles. The method includes detecting the first type reflector among the second type reflector.

12 Claims, 9 Drawing Sheets

(51) Int. Cl.
*G01S 7/41* (2006.01)
*G01S 13/50* (2006.01)
*G01S 13/536* (2006.01)
*G01S 13/93* (2006.01)
*G01S 13/94* (2006.01)
*G01S 13/00* (2006.01)

(56) References Cited

U.S. PATENT DOCUMENTS

| | | | |
|---|---|---|---|
| 3,913,099 A * | 10/1975 | Wehner et al. | 342/192 |
| 3,974,328 A * | 8/1976 | Thomas et al. | 342/27 |
| 3,983,558 A * | 9/1976 | Rittenbach | 342/160 |
| 3,992,710 A * | 11/1976 | Gabriele et al. | 342/90 |
| 4,001,820 A * | 1/1977 | Rosenbaum et al. | 342/192 |
| 4,025,920 A * | 5/1977 | Reitboeck et al. | 342/13 |
| 4,038,656 A * | 7/1977 | Webb et al. | 342/192 |
| 4,217,585 A * | 8/1980 | Fishbein et al. | 342/160 |
| 4,225,864 A * | 9/1980 | Lillington | 342/194 |
| 4,389,647 A * | 6/1983 | Fanuele et al. | 342/192 |
| 4,400,700 A * | 8/1983 | Rittenbach | 342/100 |
| 4,484,193 A * | 11/1984 | Bellew | 342/98 |
| 4,490,718 A * | 12/1984 | Opitz et al. | 342/192 |
| 4,603,331 A * | 7/1986 | Wehner | 342/192 |
| 4,641,137 A * | 2/1987 | Opitz et al. | 342/192 |
| 4,641,138 A * | 2/1987 | Opitz | 342/192 |
| 4,647,874 A * | 3/1987 | Rittenbach | 342/194 |
| 4,649,388 A * | 3/1987 | Atlas | 342/26 D |
| 4,658,372 A * | 4/1987 | Witkin | 342/195 |
| 4,743,910 A * | 5/1988 | Hill et al. | 342/159 |
| 4,803,489 A * | 2/1989 | Giori | 342/192 |
| 4,829,306 A * | 5/1989 | Gjessing et al. | 342/159 |
| 4,907,001 A * | 3/1990 | Harmuth | 342/159 |
| 5,504,487 A * | 4/1996 | Tucker | 342/90 |
| 5,528,037 A * | 6/1996 | Whitsitt | 244/3.16 |
| 5,539,412 A * | 7/1996 | Mendelson | 342/192 |
| 5,612,700 A * | 3/1997 | Tucker | 342/90 |
| 5,617,099 A * | 4/1997 | Warren et al. | 342/159 |
| 6,229,475 B1 * | 5/2001 | Woolley | 342/93 |
| 6,650,276 B2 * | 11/2003 | Lawless | 342/28 |
| 6,801,156 B1 * | 10/2004 | Wasiewicz | 342/95 |
| 6,822,606 B2 * | 11/2004 | Ponsford et al. | 342/192 |
| 6,954,404 B2 * | 10/2005 | Herberthson | 342/109 |
| 7,167,127 B2 * | 1/2007 | Collins et al. | 342/160 |
| 7,479,920 B2 | 1/2009 | Niv | |
| 7,675,458 B2 * | 3/2010 | Hubbard et al. | 342/159 |
| 7,741,992 B2 * | 6/2010 | Wang et al. | 342/93 |
| 8,013,781 B2 * | 9/2011 | Stockmann | 342/93 |
| 8,519,882 B2 * | 8/2013 | Huizing et al. | 342/25 R |

OTHER PUBLICATIONS

Genyuan Wang et al., "Maneuvering Target Detection in Over-the-Horizon Radar by Using Adaptive Chirplet Transform and Subspace Clutter Rejection", Proceedings of International Conference on Acoustics, Speech and Signal Processing (ICASSP'03) Apr. 6-10, 2003, Hong Kong, China; vol. 6, pp. 49-52.

Kun Lu et al., "Enhanced Maneuvering Targets Detection Via Polynomial, Phase Modeling in Over-the-Horizon Radars", Radar Conference, 2004. Proceedings of the IEEE Philadelphia, PA, USA, Apr. 26-29, 2004, Piscataway, NJ, USA, pp. 444-449.

Preliminary Search Report for French Application No. 1156126, dated Feb. 28, 2012, 3 pages.

* cited by examiner

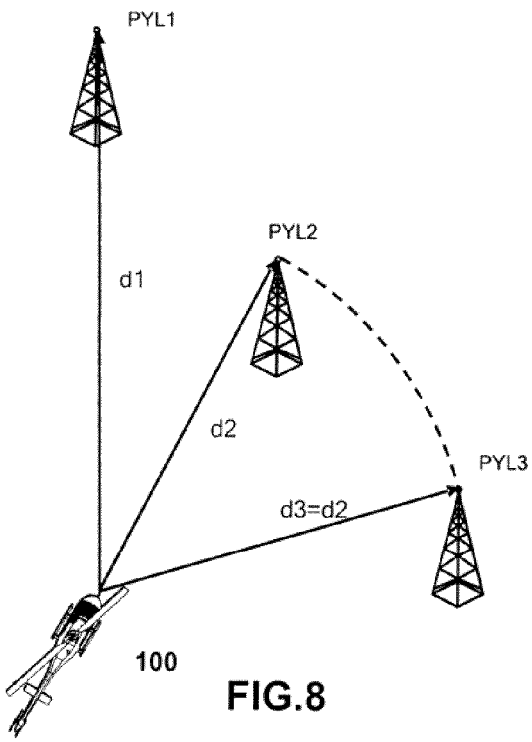
FIG.8
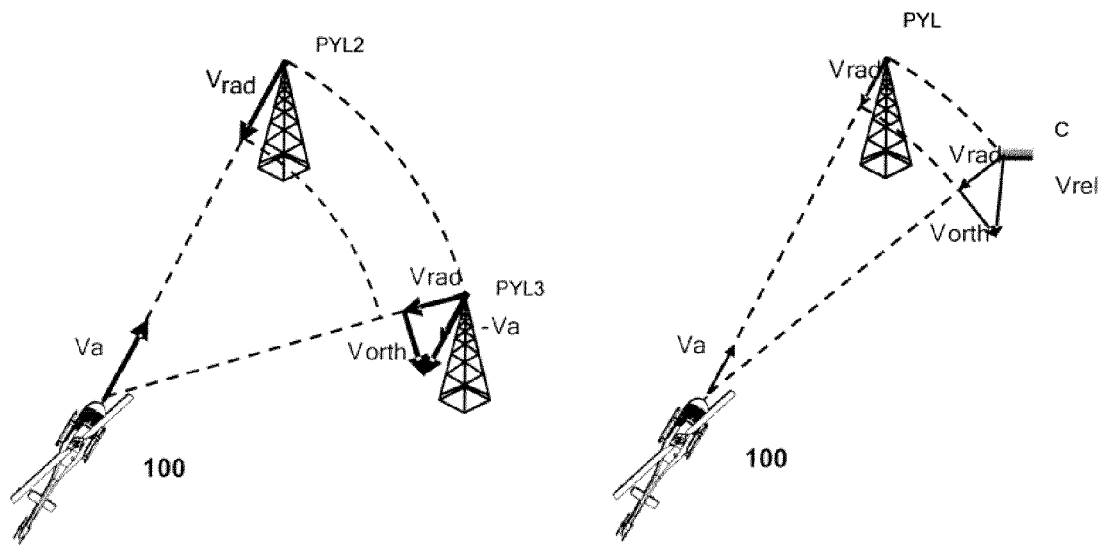
FIG.9
FIG.10

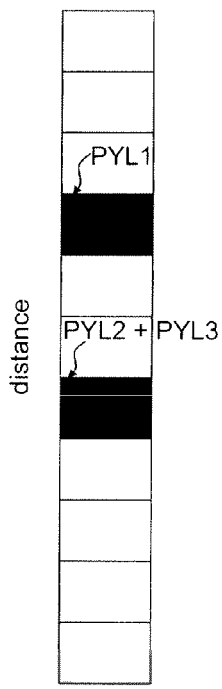 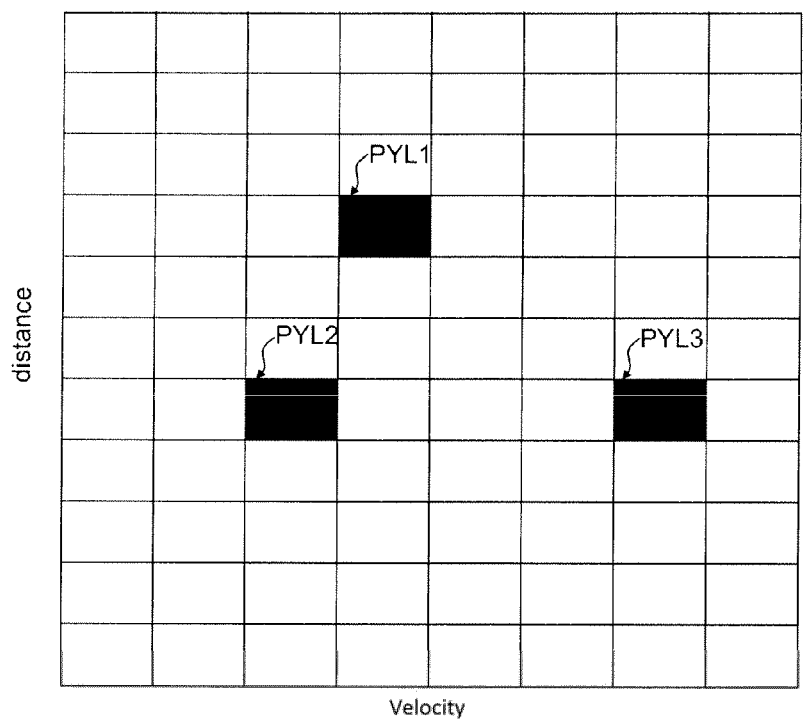
FIG.15a  FIG.15b
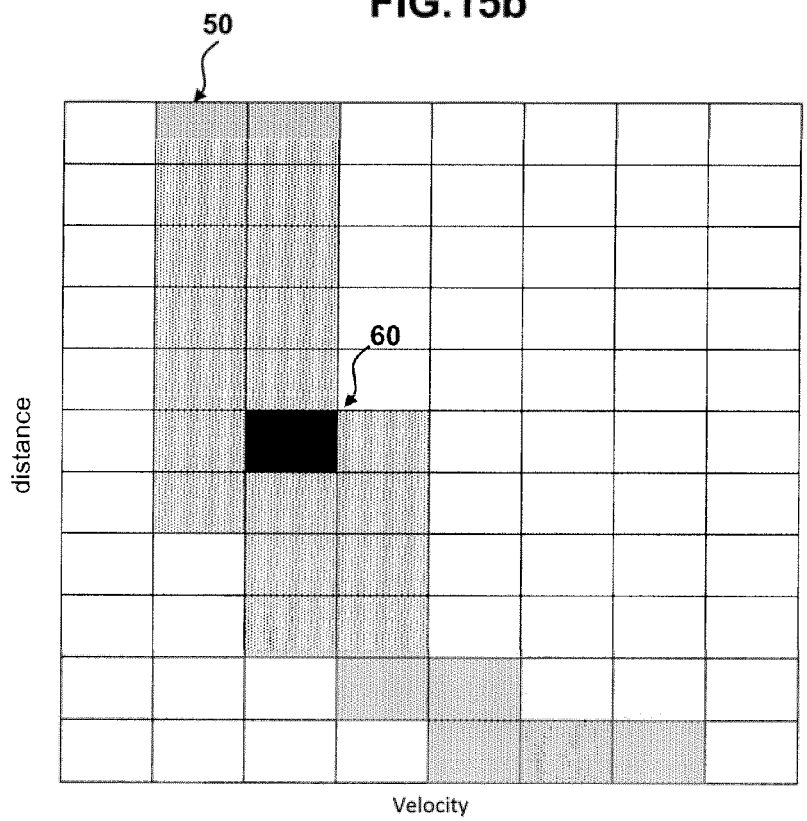
FIG.16

METHOD AND DEVICE FOR DETECTING A TARGET BY MASKED HIGH ENERGY REFLECTORS

CROSS-REFERENCE TO RELATED PATENT APPLICATIONS

This application claims the benefit of French Patent Application No. 11 56126, filed Jul. 6, 2011, and titled "PROCEDE ET DISPOSITIF DE DETECTION D'UNE CIBLE MASQUEE PAR DES REFLECTEURS DE FORTE ENERGIE," which is incorporated herein by reference in its entirety.

BACKGROUND OF THE INVENTION

The present invention relates generally to the field of the processing of the signal from a mobile, airborne radar. The disclosure relates to detection of a low-energy target that may be concealed by high-energy reflectors.

Conventional radars use radial velocity distance cartography to separate the echoes from all of the targets in terms of distance and velocity. This amounts to positioning the targets in a radial velocity distance space discretized in cells, in a manner known by those skilled in the art, as shown in FIG. 15b.

In that figure, one pylon PYL1 is situated at a distance d1 from the radar system; two pylons PYL2 and PYL3 are situated at a same distance d2, but seen from different angles, as shown in FIG. 8.

Using conventional distance processing, the radar system obtains a vector, called the distance profile, illustrated in FIG. 15a. In this profile, the pylon PYL1 will generate a local energy maximum in the distance cell corresponding to the distance d1. Likewise, the pylons PYL2 and PYL3, which are located at the same distance d2 from the system, will generate a local energy maximum in the cell corresponding to said distance d2.

This distance processing makes it possible to distinguish the pylon PYL1 from the pylons PYL2 and PYL3 on the distance profile. It does not, however, make it possible to distinguish between pylons PYL2 and PYL3.

To resolve this problem, velocity processing is conventionally applied. The output of this processing over all of the observed distances constitutes a distance-radial velocity cartography of the environment of the system, and is diagrammatically illustrated in FIG. 15b.

Owing to this velocity processing, it is now possible to distinguish between the two pylons PYL2 and PYL3. In fact, since they are seen from different angles, they have different radial velocities relative to the radar system, as illustrated by FIG. 9. Once this velocity difference is greater than the velocity resolution of the system, the two pylons PYL2 and PYL3 appear in different velocity cells.

Using conventional means, targets may be separated from their direct environment by comparing the relative energy levels on the distance velocity cartography, this direct environment being able to be made up only of noise, periodic reflectors, or extended reflectors. For example, and as shown in FIG. 16, a target 60 having energy greater than the clutter 50 can be separated from the latter.

However, a mobile target C situated in the direct environment of the pylon PYL2 (see FIG. 10), and the energy of which is at the same level as that of PYL2, is concealed by the pylon and cannot be detected.

In certain flight and observation configurations, the strong echoes can therefore lastingly conceal targets and prevent them from being detected. This concealment may also be caused by folding phenomena.

One solution may be to try to eliminate the aliasing phenomena by varying the repetitive frequency of the radar waves. This method can be used when the target is found by velocity folding in the zone of the clutter, and consists of moving the aliasing velocity so that the target is located outside the zone of the clutter for one of the repetitive frequencies. However, there is may be no repetitive frequency that makes it possible to observe the target outside the clutter zone. This solution may not be fully satisfactory.

Another solution may be to use algorithms of the STAP (Space Time Adaptive Processing) type and antenna arrays to reduce strong targets such as ground clutter. The STAP algorithms use an array of horizontal receiving antennas to exploit the angle of arrival of the targets and to discriminate along the azimuth angle in the Doppler plane, the radial velocity of an echo of the clutter being connected to its angle of arrival. However, using arrays of antennas and applying STAP algorithms imposes major constraints on the sizing of the system and increases the processing complexity.

Another solution may be to separate targets using the polarimetric properties of the targets and the clutter. This method requires at least two transmitting antennas and at least two receiving antennas, which makes its implementation more complex.

Also a method was presented by Wang et al. in the document "Maneuvering target detection in over-the-horizon radar using adaptive clutter rejection and adaptive chirplet transform," and published on Nov. 4, 2003, in the review IEE Proc. Radar Navig, Vol 150, No 4. This method makes it possible to detect moving targets on sea clutter by rejecting clutter through projection, then performing an iterative two-dimensional velocity processing through chirplet transform on the signal. However, this method is only applicable to a fixed radar. It may not be effective to reject ground clutter.

SUMMARY OF THE INVENTION

One embodiment of the invention relates to a method for detecting, in a scene, at least one reflector of a first type. The method includes identifying, using a radar in a mobile system, a zone of a distance-radial velocity space that may contain at least one reflector of a second type. The at least one reflector of the second type is capable of concealing the at least one reflector of the first type. The method includes modeling an order two phase shift over time of theoretical reflectors of the first type and theoretical reflectors of the second type. The modeling uses a kinematic signature of the theoretical reflectors. The order two phase shift is due to the Doppler effect. The method includes creating a filter for at least one distance and at least one radial velocity. The filter is computed from (a) a phase shift of the at least one reflector of the first type, at the at least one distance and the at least one radial velocity; and (b) a phase shift of the at least one reflector of the second type, at the at least one distance and for each of the radial velocities of the zone. The phase shifts are computed from the modeling of the order two phase shift. The filter is configured to attenuate, by projection, the energy of the at least one reflector of the second type and to increase, by correlation, the energy of the at least one reflector of the first type, at the at least one distance and the at least one radial velocity. The method includes illuminating the scene. The method includes acquiring raw radar data from the echoes reflected by the reflectors of the scene. The method includes obtaining distance profiles. The distance profiles are obtained by processing raw radar data to separate the reflectors of the scene in terms of distance. The profiles are collected over a long time. After the long time, the distance variation of a reflector of the scene to be considered quadratic relative to the time. The method includes applying a filter on the distance profiles. Applying the filter comprises separating the reflectors of the scene in velocity. The method includes detecting the at least one reflector of the first type among the at least one reflector of the second type.

Another embodiment of the invention relates to a tangible computer-readable storage medium, with computer-executable instructions embodied thereon that when executed by a computer system perform a method for detecting, in a scene, at least one reflector of a first type. The instructions include identifying, using a radar in a mobile system, a zone of a distance-radial velocity space that may contain at least one reflector of a second type. The at least one reflector of the second type is capable of concealing the at least one reflector of the first type. The instructions include modeling an order two phase shift over time of theoretical reflectors of the first type and theoretical reflectors of the second type. The modeling uses a kinematic signature of the theoretical reflectors. The order two phase shift is due to the Doppler effect. The instructions include creating a filter for at least one distance and at least one radial velocity. The filter is computed from (a) a phase shift of the at least one reflector of the first type, at the at least one distance and the at least one radial velocity; and (b) a phase shift of the at least one reflector of the second type, at the at least one distance and for each of the radial velocities of the zone. The phase shifts are computed from the modeling of the order two phase shift. The filter is configured to attenuate, by projection, the energy of the at least one reflector of the second type and to increase, by correlation, the energy of the at least one reflector of the first type, at the at least one distance and the at least one radial velocity. The instructions include illuminating the scene. The instructions include acquiring raw radar data from the echoes reflected by the reflectors of the scene. The instructions include obtaining distance profiles. The distance profiles are obtained by processing raw radar data to separate the reflectors of the scene in terms of distance. The profiles are collected over a long time. After the long time, the distance variation of a reflector of the scene to be considered quadratic relative to the time. The instructions include applying a filter on the distance profiles. Applying the filter comprises separating the reflectors of the scene in velocity. The instructions include detecting the at least one reflector of the first type among the at least one reflector of the second type.

Another embodiment of the invention relates to an apparatus for detecting, in a scene, at least one reflector of a first type. The apparatus includes a radar configured to illuminate the scene and to acquire raw radar data from the echoes reflected by the reflectors of the scene. The apparatus includes means for identifying, using a radar in a mobile system, a zone of a distance-radial velocity space that may contain at least one reflector of a second type. The at least one reflector of the second type is capable of concealing the at least one reflector of the first type. The apparatus includes means for modeling an order two phase shift over time of theoretical reflectors of the first type and theoretical reflectors of the second type. The modeling uses a kinematic signature of the theoretical reflectors. The order two phase shift is due to the Doppler effect. The apparatus includes means for creating a filter for at least one distance and at least one radial velocity. The filter is computed from (a) a phase shift of the at least one reflector of the first type, at the at least one distance and the at least one radial velocity; and (b) a phase shift of the at least one reflector of the second type, at the at least one distance and for each of the radial velocities of the zone. The phase shifts are computed from the modeling of the order two phase shift. The filter is configured to attenuate, by projection, the energy of the at least one reflector of the second type and to increase, by correlation, the energy of the at least one reflector of the first type, at the at least one distance and the at least one radial velocity. The apparatus includes means for obtaining distance profiles. The distance profiles are obtained by processing raw radar data to separate the reflectors of the scene in terms of distance. The profiles are collected over a long time. After the long time, the distance variation of a reflector of the scene to be considered quadratic relative to the time. The apparatus includes means for means for applying a filter on the distance profiles. Applying the filter comprises separating the reflectors of the scene in velocity. The apparatus includes means for means for detecting the at least one reflector of the first type among the at least one reflector of the second type.

BRIEF DESCRIPTION OF THE DRAWINGS

Other features and advantages of the present disclosure will emerge from the description below, in reference to the appended drawings, which illustrate one embodiment thereof that is in no way limiting. In the figures:

FIGS. 8-10 shows pylons relative to a radar system, according to an exemplary embodiment;

FIGS. 15a-15b, show the reflectors of the scene of FIG. 8 over a distance profile and over a distance-velocity cartography, respectively, according to exemplary embodiments;

FIG. 16 shows, in a distance-radial velocity cartography, the reflectors of a scene comprising a target in a high-energy zone, according to an exemplary embodiment;

DETAILED DESCRIPTION OF THE PREFERRED EMBODIMENTS

Figure 1:
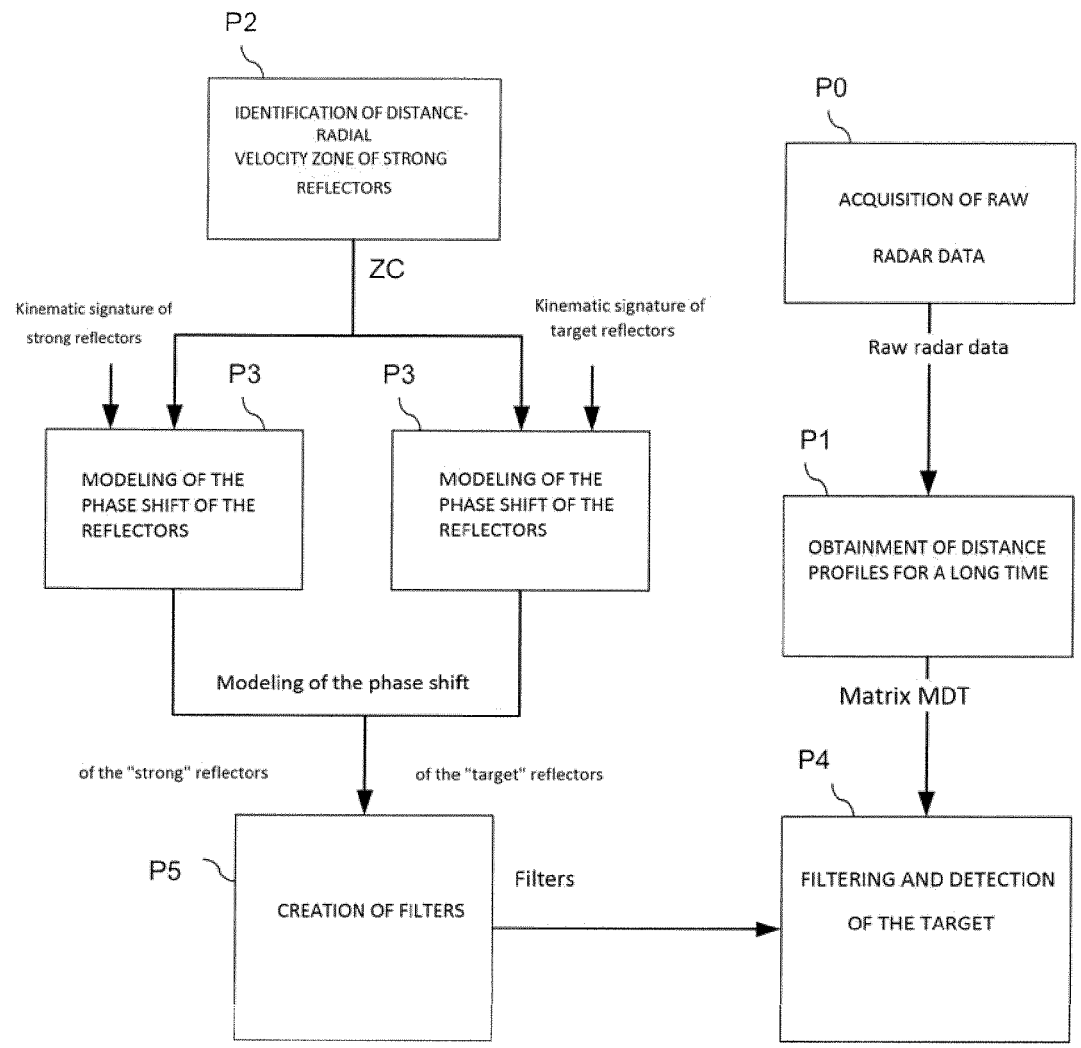
FIG. 1 shows a flowchart illustrating the main steps of a detection method, according to an exemplary embodiment

According to an exemplary embodiment, a method implemented in a mobile system comprising a radar for detecting, in a scene, at least one target reflector of a first predetermined type, called target type, that may be concealed by at least one high-energy reflector of a second type, called strong type, is disclosed. This method may comprise:

a step for identifying a zone of the distance-radial velocity space that may contain high-energy reflectors capable of concealing the target reflectors;

a step for modeling the order two phase shift over time, due to the Doppler effect, of target reflectors and strong reflectors, the modeling using the kinematic signature of said theoretical reflectors;

a step for creating a filter for at least one distance and one radial velocity given by: the phase shift of a theoretical target reflector at that distance and for that radial velocity; and the phase shift of a theoretical strong reflector at that distance and for each of the radial velocities of the zone, said phase shifts being obtained from the aforementioned modeling, said filter being designed to attenuate, by projection, the energy of the high-energy reflectors of said scene and increase, by correlation, the energy of the target reflector(s) of the scene at the given distance and for the given radial velocity;

a step for illuminating the scene and acquiring raw radar data from the echoes reflected by the reflectors of the scene;

a step for obtaining distance profiles obtained by processing raw radar data to separate the reflectors of the scene in terms of distance, said profiles being collected over a long enough time for the distance variation of a reflector of the scene to be able to be considered quadratic relative to the time;

a step for applying filters on said distance profiles, this step leading to a separation of the reflectors of the scene in velocity; and a step for detecting the target reflectors among the high-energy reflectors.

Correlatively, the disclosure relates to a device that may be incorporated in a mobile system to detect, in a scene, at least one target reflector of a first predetermined type, called target type, that may be concealed by at least one high-energy reflector of a second type, called strong type. The mobile system may comprise:

a radar capable of illuminating the scene and acquiring raw radar data from the echoes reflected by the reflectors of the scene;

means for identifying a zone of the distance-radial velocity space that may contain high-energy reflectors capable of concealing the target reflectors;

means for modeling the order two phase shift over time, due to the Doppler effect, of target reflectors and strong reflectors, the modeling using the kinematic signature of said theoretical reflectors;

means for creating a filter for at least one distance and one radial velocity given by: the phase shift of a theoretical target reflector at that distance and for that radial velocity; and the phase shift of a theoretical strong reflector at that distance and for each of the radial velocities of the zone; said phase shifts being obtained from the aforementioned modeling, said filter being designed to attenuate, by projection, the energy of the high-energy reflectors of said scene and increase, by correlation, the energy of the target reflector(s) of the scene at the given distance and for the given radial velocity;

means for obtaining distance profiles obtained by processing raw radar data to separate the reflectors of the scene in terms of distance, said profiles being collected over a long enough time for the distance variation of a reflector of the scene to be able to be considered quadratic relative to the time;

means for applying filters on said distance profiles, this step leading to a separation of the reflectors of the scene in velocity; and means for detecting the target reflectors among the high-energy reflectors.

The following exemplary definitions are used to introduce the disclosure:

Long time: "long time" refers to a long enough observation time of the scene for the distance variation of a target to be able to be considered quadratic (approximation of order two) relative to the time. For a radar, the observation time of the scene corresponds to the echo collection time.

The Doppler phase shift being directly proportional to the variation of the distance, it is also quadratic, or in other words "of order 2." The linear term of this phase shift, called order 1, is a function of the radial velocity of the target, and the quadratic term called order 2 is a function of the radial acceleration and the orthoradial velocity of the target. This observation time, typically longer than 1 second in this invention, is generally not used by detection radars, but rather by imaging radars.

Short time: "short time" refers to an observation time of the scene such that the distance variation of a target may be considered linear (approximation to order one) relative to the time.

The Doppler phase shift being directly proportional to the variation of the distance, it is also linear, or in other words, "order 1."

The detection radars typically make this approximation and use standard observation times in the vicinity of several tens of milliseconds in the state of the art.

Radial velocity and orthoradial velocity: according to the state of the art, the radial velocity of a target refers to the projection, on the axis connecting the target to the carrier, of the relative velocity of the target in relation to the carrier. The orthoradial velocity refers to the component, normal to the radial velocity, of the relative velocity of the target in relation to the carrier.

The velocities verify the following equation (FIG. 10):

$$V\text{rel}^2 = V\text{rad}^2 + V\text{orth}^2 \tag{eq. 1}$$

where Vrel is the relative velocity of the target in relation to the carrier.

Kinematic signature: The kinematic signature is the relationship that connects the orthoradial velocity and the radial velocity of a target, said velocities being relative in relation to the mobile system. The kinematic signature corresponds to a particular kinematic behavior of a target in relation to the system.

Fixed ground reflector: "Fixed ground receptor" refers to the reflectors having a zero airspeed. From the platform, their relative velocity is equal to the movement velocity of the platform and in the opposite direction. For example, in FIG. 9, the pylons PYL2 and PYL3 have a relative velocity "−Va" from the platform.

The kinematic signature of these reflectors verifies the equation:

$$Va^2 = Vrad^2 + Vorth^2 \quad (eq.\ 2)$$

where Va is the velocity of the carrier, which may for example be provided by an onboard GPS.

In particular, the ground clutter is made up of a multitude of elementary reflectors fixed to the ground having the kinematic signature given by equation (2).

Target collision reflector: "Target collision reflector" refers to the target reflectors whereof the path will cross that of the system. They have a radial velocity oriented toward the system and a zero orthoradial velocity:

$$Vorth^2 = 0 \quad (eq.\ 3)$$

The detection method and device, according to an exemplary embodiment, may advantageously be used in a radar system comprising only one transmitting antenna, only one receiving antenna, and only one repetitive frequency. This makes it possible to obtain a clutter rejection system in particular having a low cost and complexity relative to the clutter rejection systems for mobile radars known to date.

The solution according to the disclosure can in particular be used to detect collision targets concealed by the ground clutter.

As a result, in a first particular embodiment, the kinematic signature of the target reflectors is defined by a zero orthoradial velocity.

Advantageously, the modeling used by the invention, in particular for the clutter, does not require secondary data.

Furthermore, the velocity processing according to the invention is done over a single velocity dimension (defined by the target signature), and does not require successive iterations. The velocity processing of the prior art proposed by Wang is an iterative processing with two dimensions that is much heavier in terms of computation time, compounded by the need for an iteration to detect the targets with lower energy levels.

According to an exemplary embodiment, the filter used in the invention is an oblique projection matrix known by those skilled in the art of signal processing.

This feature advantageously makes it possible to reject high-energy reflectors (for example, ground clutter) and to perform the velocity processing simultaneously, whereas the prior art separates the processing into two steps.

In various embodiments, the step for identifying a zone of the distance velocity space comprises:

a step for building the distance-radial velocity cartography resulting from the raw radar data observed during a short time; and a step for analyzing that cartography.

The construction of the distance-velocity cartography traditionally consists of applying the following processing: collection of raw radar data over a "short time," separating targets in terms of distance using a fast Fourier transform called distance FFT, and separating targets in terms of radial velocity using so-called Doppler FFT processing.

The analysis of the cartography may be done in several ways.

A first solution uses conventional processing methods of processing images and includes:

forming an image from the cartography, whereof the color choice is based on the energy levels of the cartography, and whereof the contrast is sufficient at least to differentiate the noise zones without reflectors and the high-energy reflector zones, applying image processing algorithms to segment the image into zones, for example by detecting contours, or by shape recognition when the shape of the zones of the high-energy reflectors is known, classifying these zones, according to criteria, for example scope or total power, to identify the high-energy reflector zones that may conceal the targets to be detected.

Another solution uses conventional processing and includes:

performing a detection by thresholding high-energy reflectors, for example using a constant false alarm rate CFAR detection algorithm, grouping the detections together in "clusters" or zones by clustering algorithm, for example closest neighbor algorithm, classifying said clusters according to criteria, for example scope or total power of the cluster, to identify the high-energy reflector zones that may conceal the targets to be detected.

In various other embodiments, the step for identifying the zone in the distance velocity space is performed from a priori knowledge of the observation geometry, of the antenna diagram of said radar and, of the characteristics of the flight of the system.

According to an exemplary embodiment, the step for obtaining the distance profiles comprises processing compensating for the distance migration of the reflectors over the long time.

This processing makes it possible to offset the fact that the reflectors may change distance cells if their movement relative to the radar is greater than the size of a distance cell.

According to an exemplary embodiment, the detection step uses a detector of the CFAR type.

Alternatively, the step for detecting the target reflectors and estimating the noise level, for a distance-radial velocity cell, uses only said collector distance profiles, at that distance.

According to an exemplary embodiment, the different steps of the detection method according to the invention are determined by instructions from computer programs embodied on tangible computer-readable storage media.

Consequently, the disclosure also relates to a computer program embodied on a tangible computer-readable storage medium, said program being able to be run by a computer, said program comprising instructions adapted to the implementation of the steps of a detection method as mentioned above.

This program may use any programming language, and be in the form of source code, object code, or intermediate code between source code and object code, such as in a partially compiled form, or in any other desired form.

The invention also relates to a tangible computer-readable storage medium readable by a computer, and comprising instructions for a computer program as mentioned above.

The tangible computer-readable storage medium may be any entity or device capable of storing the program. For example, the medium may comprise a storage means, such as a ROM, for example a CD-ROM or a microelectronic circuit ROM, or a magnetic recording means, for example a disk (floppy disk) or a hard drive.

Furthermore, the information medium may be a transmissible medium such as an electrical or optical signal, which can be conveyed by means of an electrical or optical cable, radio, or by other means. The program according to the invention may in particular be downloaded on a network such as the Internet.

Alternatively, the tangible computer-readable storage medium may be an integrated circuit in which the program is incorporated, the circuit being adapted to run or to be used in the execution of the method in question.

One application of the disclosure includes detection of a collision target concealed by ground clutter.

In reference to FIGS. 1 to 19, various embodiments of a method and a device making it possible to detect target reflectors are described. According to an exemplary embodiment, the target reflectors are of a predetermined type in a scene that may be concealed by high-energy reflectors.

In general, these methods and these devices apply, on data acquired by radar, to filters that may be created either from the data itself (first alternative), or a priori, without using the radar, from general knowledge of the scene and of characteristics of the radar and flight conditions (second alternative). The disclosure will primarily be described in this second alternative embodiment.

According to an exemplary embodiment, the method according to the disclosure implements six main steps illustrated in FIG. 1, i.e.:
a step P0 for acquiring raw radar data;
a step P1 for obtaining distance profiles for a long time;
a step P2 for identifying high-energy zones;
a step P3 for modeling the reflectors of the scene;
a step P5 for creating filters for a long time; and
a step P4 for applying said filters and detecting targets.

It appears in this figure that steps P2 for identification of zones, P3 for modeling, and P5 for creating filters may be performed before, after, or in parallel with steps P0 for acquiring raw radar data and P1 for obtaining distance profiles.

Figure 12:
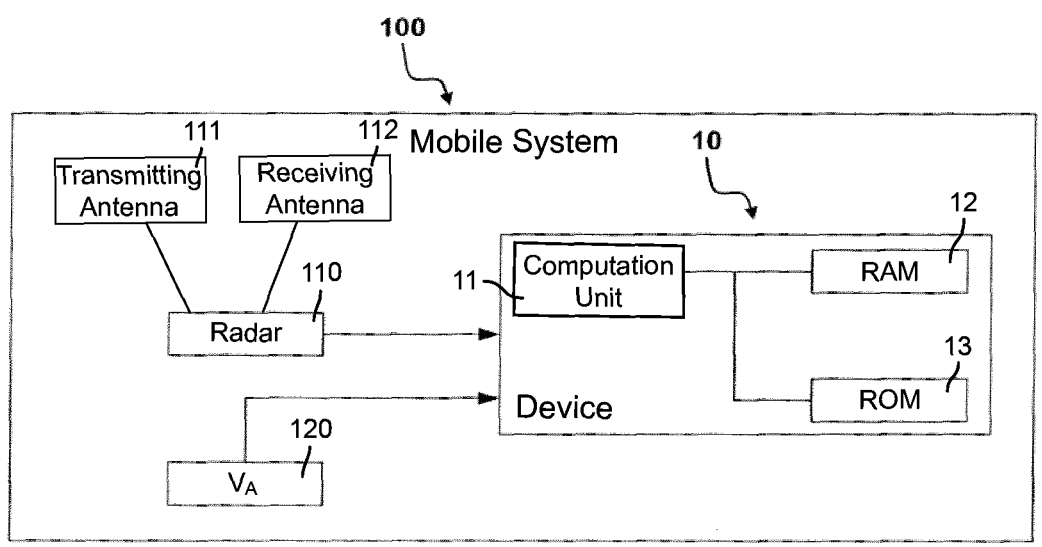
FIG. 12 shows a mobile system comprising a device, according to an exemplary embodiment.

FIG. 12 diagrammatically shows a mobile system 100 comprising a radar 110 and a device 10 according to the invention.

According to an exemplary embodiment, the radar 110 with range Dmax comprises an azimuth opening angle denoted φ. It uses a waveform of the frequency-modulated continuous-wave (FMCW) type with central wavelength lambda and frequency band B. It comprises a single transmitting antenna 111 and a single receiving antenna 112, and performs a homodyne demodulation known by those skilled in the art.

According to an exemplary embodiment, the device 10 has the material architecture of a computer. It in particular comprises a computation unit 11, a random-access memory of the RAM type 12, and a read-only memory of the ROM type 13.

This read-only memory 13 constitutes a medium within the meaning of the invention. It comprises a computer program PG, which, when it is run by the computation unit 11, executes instructions to implement the steps of the method of FIG. 1.

According to an exemplary embodiment, the device 10 comprises means 120 for obtaining the velocity Va, altitude and attitude of the mobile system 100, for example by GPS and the inertial unit of the mobile platform.

Figure 2:
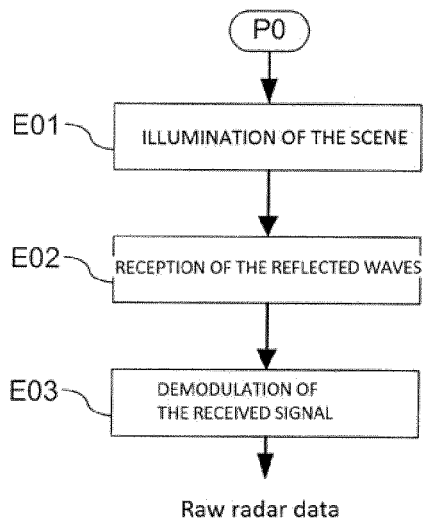
FIG. 2 shows a flowchart illustrating a step for acquiring raw radar data that may be used in the invention, according to an exemplary embodiment.
Figure 19:
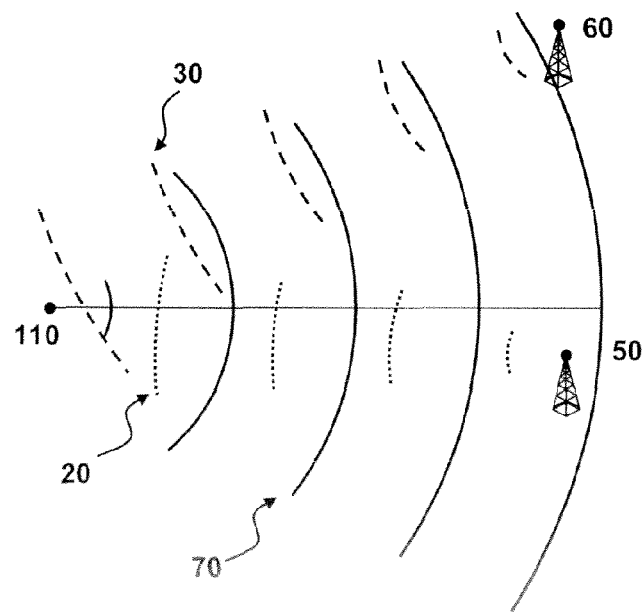
FIG. 19 shows a scene including a radar, reflectors, and the reflectors' echoes, according to an exemplary embodiment.

In reference to FIGS. 2, 12 and 19, an exemplary embodiment step P0 for acquiring raw radar data is described.

According to an exemplary embodiment, the radar 110 emits a wave 70 with shape FMCW that propagates in the scene (step E01). In this embodiment, the wave is emitted by the single transmitting antenna 111.

The emitted waveform is repeated by cycles of Tr seconds. This wave is backscattered by each reflector of the scene in the form of echoes of the wave. Only two reflectors 50, 60 and their echoes 20, 30 are shown in FIG. 19. These echoes are then received by the single receiving antenna 112, which is distinct from the transmitting antenna 111 (step E02).

The received signals are demodulated, sampled and quantified (step E03) to form raw radar data.

Figure 3:
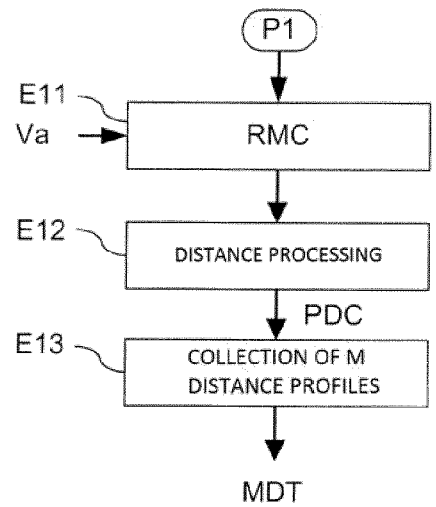
FIG. 3 shows a flowchart illustrating a step for obtaining distance profiles that may be used in the invention, according to an exemplary embodiment.

In reference to FIG. 3, an exemplary embodiment of a step P1 for obtaining distance profiles according to the disclosure is described.

The collection of the distance profiles may be done over a long time, within the meaning of the disclose.

More specifically, in this embodiment, this step P1 comprises the following three sub-steps:
compensating for distance migration (step E11);
distance processing (step E12); and
distance profile collection (step E13).

More specifically, upon each repetition cycle Tr of the radar, the reflectors may be separated (step E12) by distance, for example by a Fourier transform, to obtain a distance profile vector PDC containing distance cells. The size of the distance cells corresponds to the distance resolution of the radar c/2B, and contains energy and phase information, which is the sum of the contributions of all of the reflectors situated at the considered distance.

During the long time used by the device 10, the reflectors can change distance cells if their movement relative to the radar 110 is larger than the size of a distance cell.

In this embodiment, the device 10 according to the invention establishes (step E11) RMC processing to compensate distance cell changes by the reflectors, changes due to the movement of the mobile platform, during the long time.

The conventional RMC processing is not be described in detail herein. It uses the velocity Va of the mobile system 110, provided by the means 120 previously described.

According to an exemplary embodiment, the device 10 collects distance profiles upon each cycle during a long time (step E13), and forms a distance-time matrix denoted MDT with M columns. In this MDT matrix:
a column is one of the distance profile vectors PDC calculated in step E12; and
a row corresponds to the observation over time of the energy and the phase of a same distance cell d, and will be called time signal MDT(d) hereafter. The time signal MDT(d) represents the sum of the signals from the echoes of all of the reflectors situated in the distance cell d.

The choice of the number M of radar cycles defines the long time of the invention; according to the invention, it is great enough for the distance variation of the reflectors to be able to be considered quadratic relative to the time:

$$d(t) = d0 + V\text{rad} \times t + \frac{1}{2}(A\text{rad} + V\text{orth}^2/d0) \times t^2 \quad \text{(eq. 4)}$$

where $d(t)$ represents the distance of a reflector at time t; d0 represents the distance of said reflector at the initial time t=0; Vrad represents the radial velocity of said reflector; Arad represents the radial acceleration of said reflector; and Vorth represents the orthoradial velocity of said reflector, Vrad, Arad and Vorth being considered constant throughout the long observation time.

As a result, the phase shift due to the Doppler effect translating the distance variation of the reflector relative to the mobile system 100 is quadratic in relation to the time.

This order 2 phase shift is written traditionally:

$$2\text{pi}/\text{lambda} \times (V\text{rad} \times t + \frac{1}{2}(A\text{rad} + V\text{orth}^2/d0) \times t^2) \quad \text{(eq. 5)}$$

in which lambda represents the central wavelength emitted by the radar 110.

"Phase law of a reflector" refers to the complex exponential of its phase shift during the time defined by equation (5):

$$\exp[j2\text{pi}/\text{lambda} \times (V\text{rad} \times t + \frac{1}{2}(A\text{rad} + V\text{orth}^2/d0) \times t^2)]$$

In general, step P2 identifies, in the distance-radial velocity space, one or more zones in which high-energy reflectors are situated that are capable of concealing the target reflectors to be detected.

Figure 17:
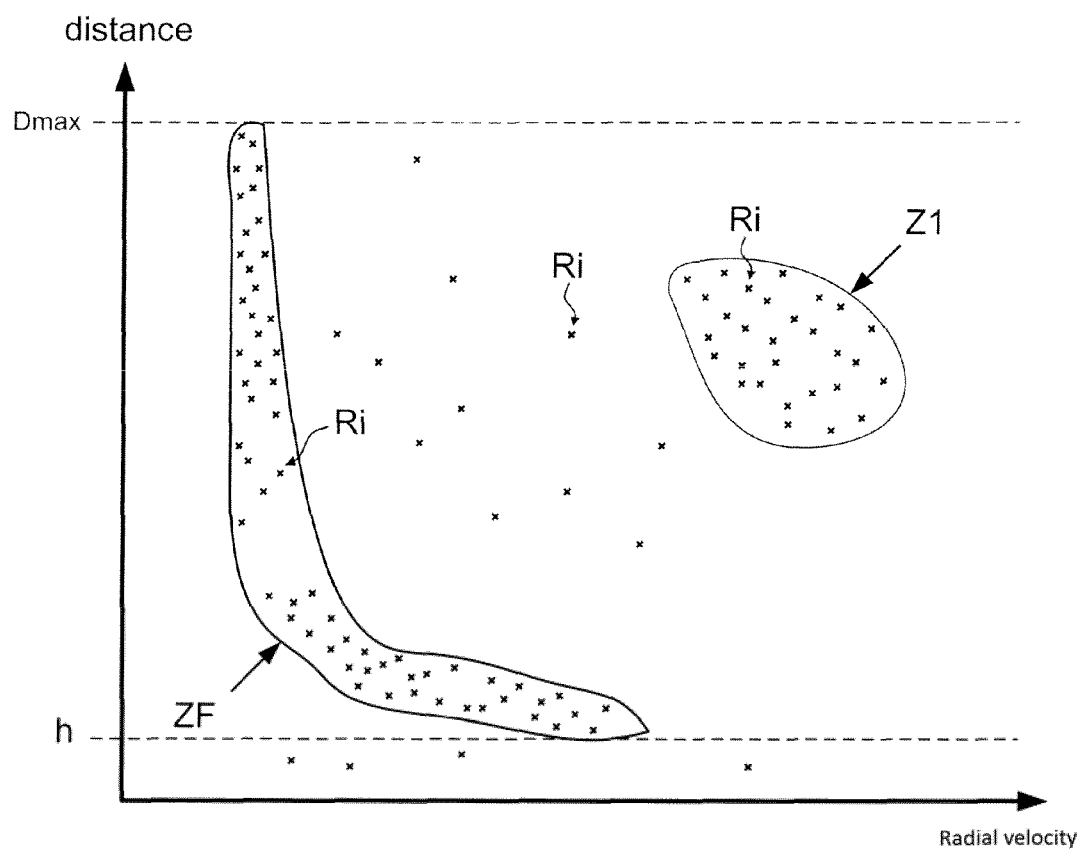
FIG. 17 shows, in the distance-radial velocity space, reflectors and high-energy zones, according to an exemplary embodiment.

FIG. 17 presents an example of distance-radial velocity space in which: the points Ri, represented by x's, designate reflectors of the scene; and two zones Z1 and ZF designate high-energy zones, the J-shaped zone ZF representing the ground clutter zone.

According to an exemplary embodiment, the detection method and device according to the invention identify the high-energy zone ZF corresponding to the ground clutter, the target reflectors to be detected only being sought in that zone.

It will be recalled that the disclosure is described here in its second alternative, and more specifically in an embodiment using the hypotheses of flat ground and horizontal stabilized flight, these hypotheses making it possible to deduce, a priori and geometrically, the clutter zone using the velocity, the height of the mobile system 100 in relation to the ground, and the angular observation zone of the scene.

Figure 4:
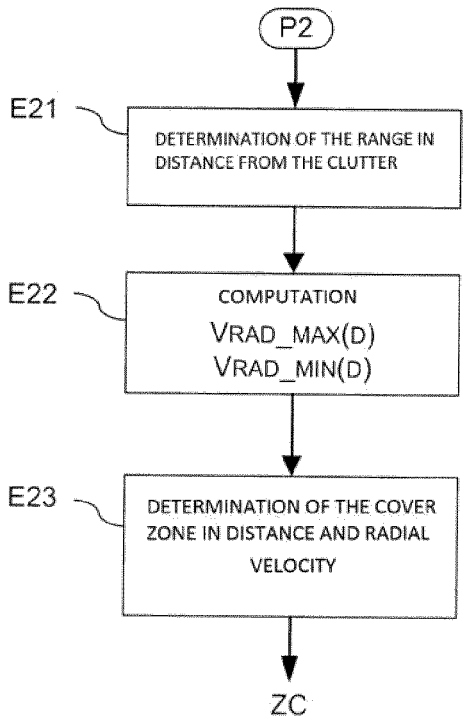
FIG. 4 shows a flowchart illustrating one example of a step for identifying a ground clutter zone, according to an exemplary embodiment.

According to an exemplary embodiment, and as shown in FIG. 4, step P2 for identifying the clutter zone comprises the following three sub-steps:
  determining the ground clutter distance range (step E21);
  computing the radial velocities of the ground clutter at those distances (step E22); and
  determining a zone covering the clutter zone (step E23).

Figure 18:
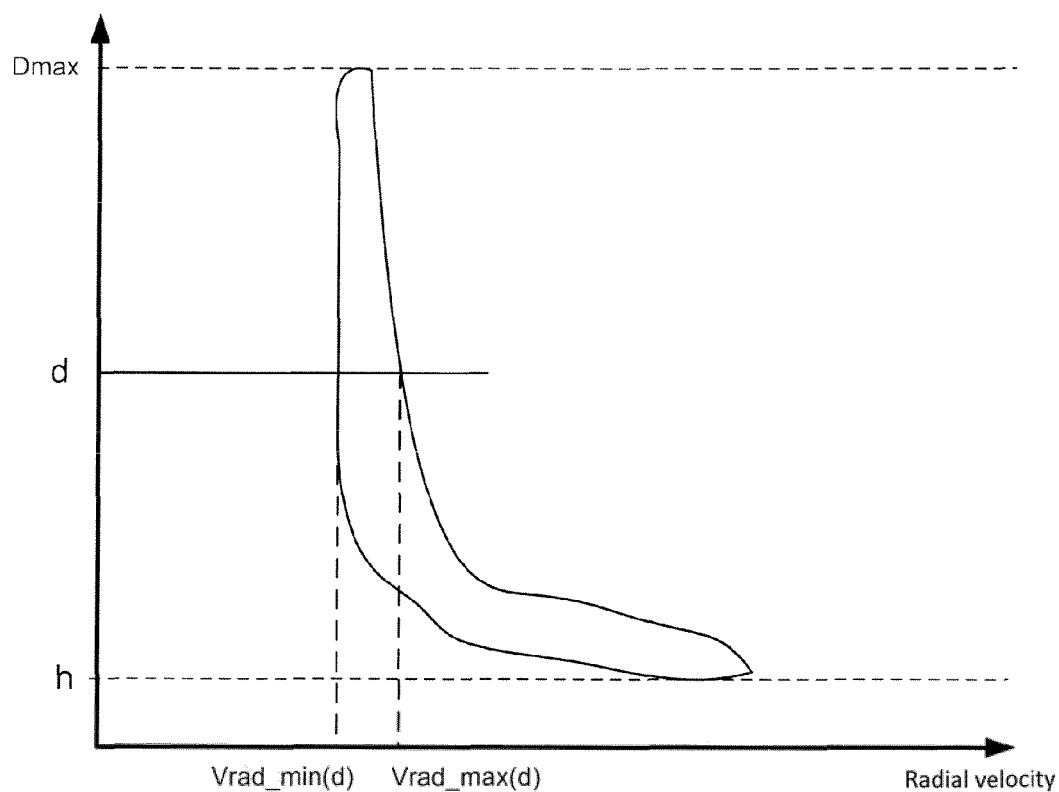
FIG. 18 shows, in certain hypotheses, the position of the high-energy zone corresponding to the ground clutter in the distance-radial velocity space, according to an exemplary embodiment.

In reference to FIG. 18, and in the preceding hypothesis of horizontal flight, the distance range in which the ground clutter is situated is determined (step E21), said range being bounded on the one hand by the height h of the mobile system 100 relative to the ground, and on the other hand by the range Dmax of the radar 110.

Figure 11:
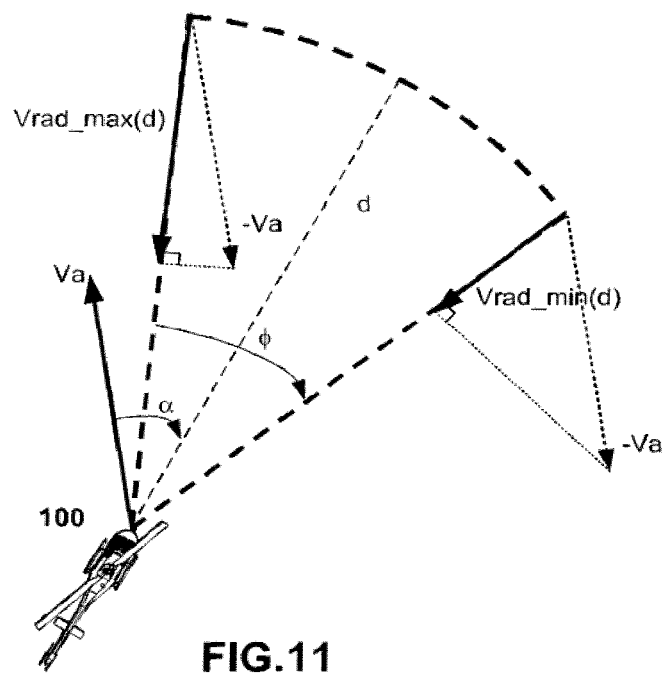
FIG. 11 shows the mobile system and the geometric parameters making it possible to calculate a priori the radial velocities of reflectors on the ground situated at a distance d from the system, according to an exemplary embodiment.

For a given distance d, the device 10, according to an exemplary embodiment, computes, during a step E22, the range [Vrad_min(d), Vrad_max(d)] of radial velocities corresponding to the ground clutter, using the following geometric relationships:
when $|\alpha| > \phi/2$:

$$\text{Vrad\_max}(d) = V_a \sqrt{1 - \left(\frac{h}{d}\right)^2} \cos(\alpha - \phi/2) \quad \text{(eq. 6-7)}$$

$$\text{Vrad\_min}(d) = V_a \sqrt{1 - \left(\frac{h}{d}\right)^2} \cos(\alpha + \phi/2)$$

when $|\alpha| < \phi/2$:

$$\text{Vrad\_max}(d) = V_a \sqrt{1 - \left(\frac{h}{d}\right)^2} \quad \text{(eq. 6-7)}$$

$$\text{Vrad\_min}(d) = V_a \sqrt{1 - \left(\frac{h}{d}\right)^2} \cos(\alpha + \phi/2)$$

in which: Va is the velocity of the mobile system 100; h is its height relative to the ground; d is the observation distance from the ground; $\phi$ is the azimuth opening angle of the radar; $\alpha$ is the angle between the direction of movement of the mobile system and the line of sight of the radar; as shown in FIG. 11.

As illustrated in FIG. 18, the ground clutter zone is in the characteristic shape of a J-hook in the distance-radial velocity space.

According to an exemplary embodiment, the detection method according to the invention uses, for the continuation of the processing, a zone ZC corresponding to the clutter zone ZF. In other embodiments, it is possible to determine (during a step E23) a zone ZC covering the clutter zone ZF.

In general, during a step P3, the order two phase shift due to the Doppler effect of the reflectors of the scene is modeled.

To that end, the phase law given by equation (5) is used, verified for all of the reflectors, and their kinematic signatures to obtain a modeled phase shift depending only on the radial velocity and the distance. This step P3, as shown in FIG. 1, is done on the one hand to model the phase shift of the strong reflectors and on the other hand to model the phase shift of the target reflectors.

Figure 5:
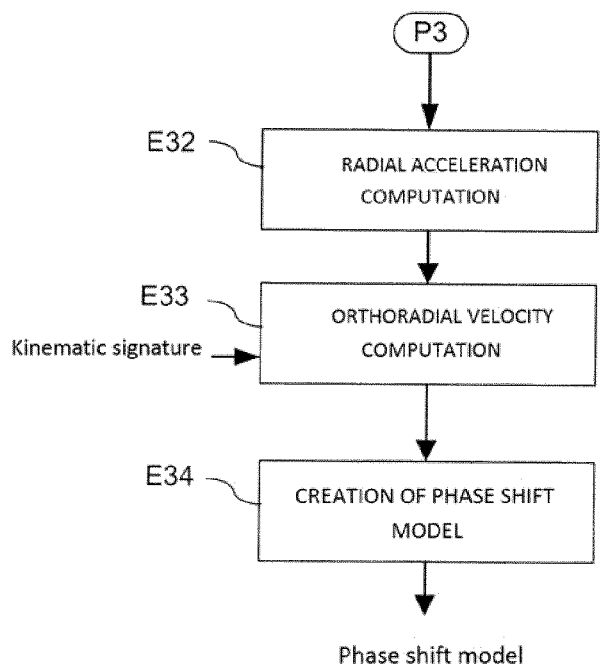
FIG. 5 shows a flowchart illustrating a modeling step that may be used in the invention, according to an exemplary embodiment.

More specifically, in this example, as shown in FIG. 5, the step P3 comprises the following sub-steps:
  Computation of the radial acceleration Arad (E32);
  Computation of the orthoradial velocity Vorth(d) (E33); and
  Creation of the model of the phase shift of the reflector (E34).

During step E32, the device 10 may compute the radial acceleration of the reflectors. In the embodiment described here, the device 10 uses the hypothesis of a horizontal stabilized flight and reflectors fixed on the ground (strong reflectors within the meaning of the invention). The radial acceleration Arad of the strong reflectors is therefore zero. In the embodiment described here, the interest is in the detection of collision targets (target reflectors within the meaning of the invention). The radial acceleration Arad of the target reflectors is therefore also zero.

During step E33, the device 10 may compute the orthoradial velocity of the reflectors. This is obtained from the kinematic signature of the receptor that connects the radial velocity Vrad and the orthoradial velocity Vorth.

According to an exemplary embodiment, the kinematic signature of the strong reflectors is predetermined. This signature is the kinematic signature of the clutter given by equation (2). In other embodiments, it may be obtained during flight, for example chosen by the pilot from a kinematic signature database as a function of the scene.

According to an exemplary embodiment, the kinematic signature of the target reflectors is predetermined. In the example of collision targets, the kinematic signature of equation (3) is used.

During step E34, the device 10 may model the phase shift of the theoretical reflectors. To that end, the order two phase shift expressed by equation (5), recalled below, is used.

$$2\text{pi}/\text{lambda} \times (\text{Vrad} \times t + \tfrac{1}{2}(\text{Arad} + \text{Vorth}^2/d0) \times t^2) \quad \text{(eq. 5)}$$

in which the values of Arad computed in step E32 are filled in and Vorth is replaced by its relationship to Vrad obtained in step E33.

According to an exemplary embodiment, two types of kinematic signatures are used, which define two types of theoretical reflectors, i.e. "strong" theoretical reflectors and "target" theoretical reflectors, leading to two models.

In general, during a step P5, a filter may be is created for a given distance and radial velocity. This filter is calculated:
  from the phase shift of a target theoretical reflector at that distance and for that radial velocity; and
  from the phase shift of a strong reflector for that distance and for each of the radial velocities of the zone ZC.

Figure 7:
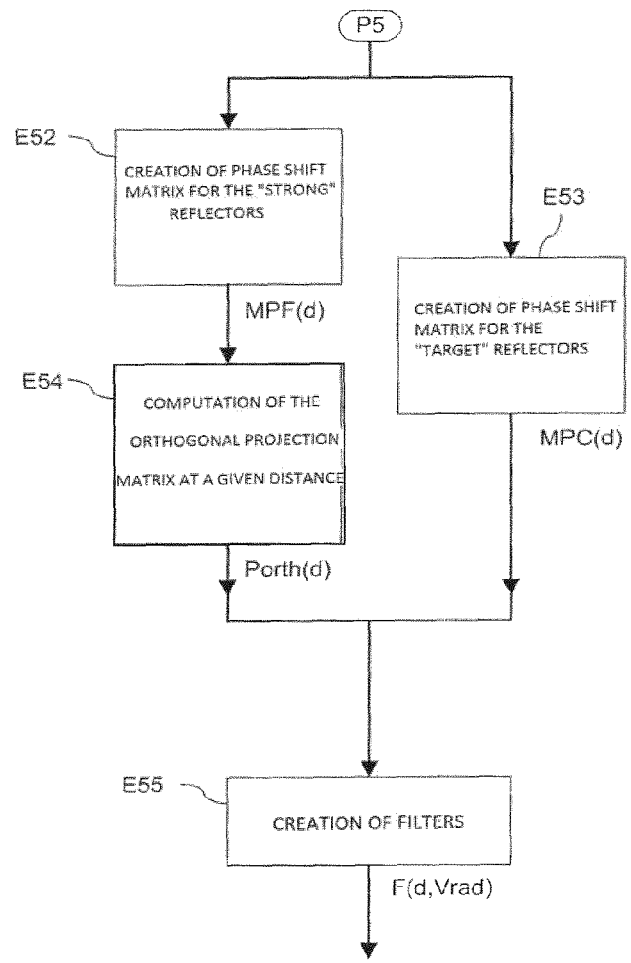
FIG. 7 shows a flowchart illustrating a step for creating filters that may be used in the invention, according to an exemplary embodiment.

More specifically, in this embodiment, the step P5 comprises, in reference to FIG. 7:
  a sub-step for creating a matrix of the phase shifts of the strong reflectors (step E52);
  a sub-step for creating a matrix of the phase shifts of the target reflectors (step E53);

a sub-step for computing an orthogonal projection matrix at a given distance (step E54); and a sub-step for creating a filter for a given distance and radial velocity (step E55).

In step E52, the phase shift of a strong theoretical reflector may be computed at the distance for which the filter is created for each of the radial velocities of the zone ZC, this phase shift being obtained from the model of step P3.

Likewise, in step E53, the phase shift of a target theoretical reflector may be computed at the distance and for the radial velocity for which the filter is created, this phase shift being obtained from the model step P3.

For this given distance d, these phase shifts may be stored in a first phase shift matrix MPF(d) (second phase shift matrix MPC(d), respectively), these phase shifts being computed at time k·Tr and at velocities Vrad(d) (at the velocity Vrad for which the filter is created, respectively).

In this matrix, the indicator k varies in the rows and the radial velocities Vrad vary in columns. The elements of this matrix are the phase shifts of theoretical reflectors and are written, in this embodiment:

$$\exp\left(j2\pi\left(\frac{2Vrad(d)}{\lambda}kT_r + \frac{Vorth^2(d)}{\lambda d}k^2 T_r^2\right)\right) \quad \text{(eq. 6)}$$

in which equation: k is an integer varying from 0 to M−1; the velocity Vrad(d) is equal, for MPC(d), to the velocity for which the filter is created; and the velocity Vrad(d) varies, for MPF(d), from Vrad_min(d) to Vrad_max(d), following the velocity pitch Δv=λ/2MT$_r$, where Δv is the resolution in velocity of the radar 110; and Vorth(d) is obtained from Vrad (d) using the kinematic signature of the theoretical reflectors as described in step P3.

For the first matrix MPF(d), the kinematic signature of the strong reflectors may be used (equation (2)); for the second matrix MPC(d), the kinematic signature of the target reflectors may be used (equation (3)). In this way, a column of MPF(d) (MPC(d), respectively) models the phase shift over time of a strong reflector (of a target reflector, respectively) at distance d and radial velocity Vrad. A row of MPF(d) (MPC (d), respectively) models the phase shift at a given moment of the strong reflectors (of the target reflectors, respectively) at distance d.

The matrix MPF(d) (MPC(d), respectively) represents the noise sub-space (signal sub-space, respectively) of the strong reflectors (of the target reflectors, respectively) and with constant amplitudes throughout the time.

These two sub-spaces are distinct, since the kinematic signatures of the strong and target reflectors are different.

The filter created during this step P5 may use a projection in relation to the noise sub-space.

In some embodiments, this projection is an orthogonal projection capable of attenuating the energy of the strong reflectors. It requires the computation of the orthogonal projection matrix in relation to the noise sub-space.

In other embodiments, this projection is an oblique projection capable of attenuating the energy of the strong reflectors and increasing the energy of the target reflectors. It also requires the computation of the orthogonal projection matrix in relation to the noise sub-space.

During a step E54, the device 10 may compute this orthogonal projection matrix in relation to the noise sub-space.

The orthogonal projection matrix, denoted Porth(d), may be computed from the matrix MPF(d), which represents the noise sub-space. It is written in the following form:

$$Porth(d)=I-MPF(d)\cdot(MPF(d)^*\cdot MPF(d))^{-1}\cdot MPF(d)^* \quad \text{(eq. 8)}$$

where I is the identity matrix and the operator * designates the transconjugation operation of a matrix. By definition, Porth (d)·MPF(d)=0.

During a step E55, the device 10 may create a filter F(d, Vrad) for a given distance and radial velocity from Porth(d). Various embodiments are possible.

In some embodiments, the filter created during this step E55 is an orthogonal projection, followed by a correlation. This orthogonal projection amounts to multiplying the time signal MDT(d) by the orthogonal projection matrix Porth(d):

$$Porth(d)\cdot MDT(d)T$$

in which equation the operator T designates the transposition operation of a matrix.

The correlation that follows the projection in these embodiments is done relative to the signal sub-space defined by the matrix MPC(d), and amounts to multiplying the projection output signal by the column of MPC(d) corresponding to the radial velocity Vrad and denoted MPC(d,Vrad):

$$MPC(d,Vrad)^*\cdot Porth(d)\cdot MDT(d)T$$

The filter F(d, Vrad) is then defined as follows:

$$F(d,Vrad)=Porth(d)\cdot MPC(d,Vrad)\cdot MPC(d,Vrad)^*\cdot Porth(d) \quad \text{(eq. 9)}$$

In these embodiments, the filter therefore successively applies an orthogonal projection to attenuate the energy of the strong reflectors, and a correlation to increase the energy of the target reflectors.

Furthermore, this correlation amounts to performing velocity processing adapted to the kinematic signature of the target reflectors. In these embodiments, the target reflectors are collision reflectors and have a zero quadratic phase shift: the adapted velocity processing is for example a discrete Fourier transform.

In other embodiments, the filter created during this step E55 is an oblique projection. The two signal and noise sub-spaces defined in the invention may not be orthogonal. This may advantageously avoid eliminating part of the signal sub-space. The use of an oblique projection may be better adapted to the two sub-spaces present An oblique projection may use the orthogonal projection matrix at the noise sub-space Porth(d), and the matrix MPC (d) representing the signal sub-space. The oblique projection matrix may be obtained from the following equation:

$$F(d,Vrad)=Porth(d)\cdot p\cdot(p^*\cdot Porth(d)\cdot p)^{-1}\cdot p^*\cdot Porth(d) \quad \text{(eq. 10)}$$

in which p designates the column of MPC(d) at the velocity Vrad.

An oblique projection may make it possible simultaneously to attenuate the energy of the strong reflectors and increase the energy of the target reflectors. It may also perform velocity processing adapted to the kinematic signatures of the target reflectors.

According to an exemplary embodiment, the target reflectors to be detected are sought in a processing zone ZT chosen in the distance-radial velocity space. Generally, during a step P4, the filters obtained in step P5 may be applied on the time signals obtained in step P1, for the distances and radial velocities of the processing zone ZT, then a step is carried out to detect the target reflectors of the scene.

Figure 6:
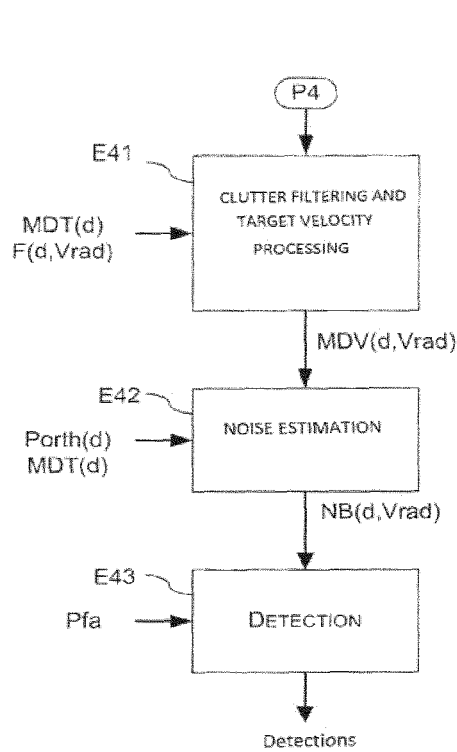
FIG. 6 shows a flowchart illustrating a filter application and target detection step that may be used in the invention, according to an exemplary embodiment.

More specifically, step P4 comprises, in reference to FIG. 6:
- a sub-step for applying filters (step E41);
- a sub-step for estimating the noise (step E42); and
- a sub-step for detecting the target reflectors (step E43).

During a step E41, the device 10 may apply the filters F(d,Vrad) on the time signals MDT(d), for each distance d and radial velocity of the zone ZT, so as to obtain the distance velocity matrix MDV:

$$MDV(d, Vrad) = |MDT(d)^{T*} \times F(d, Vrad) \times MDT(d)^{T}| \quad \text{(eq. 11)}$$

in which equation the operators T and * designate the transposition transconjugation operations of a matrix.

Applying these filters simultaneously may eliminate reflectors resulting from the clutter, reinforces any concealed targets, and performs the velocity processing known by those skilled in the art of radars. This velocity processing makes it possible to form a distance-radial velocity cartography of the processing zone ZT.

The value MDV(d,Vrad) is an estimate, in the sense of processing of the signal, of the energy remaining after elimination of the clutter, in the distance velocity d, Vrad cell. As a result: if a target is present in that cell, MDV(d,Vrad) measures the energy of that target; otherwise, MDV(d,Vrad) is a noise measurement in that cell.

Figure 13:
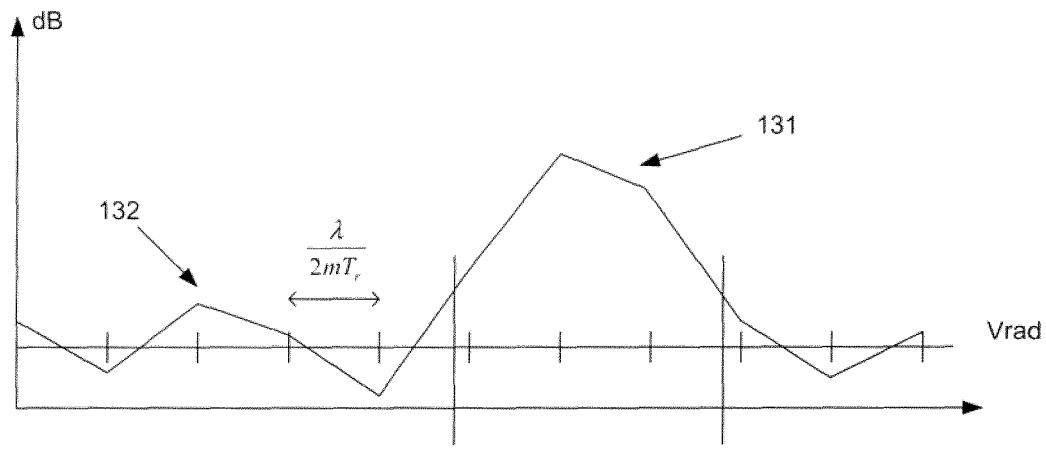
FIGS. 13-14 shows the result of velocity processing obtained using conventional means and by applying the filters of FIG. 6, respectively, according to exemplary embodiments.
Figure 14:
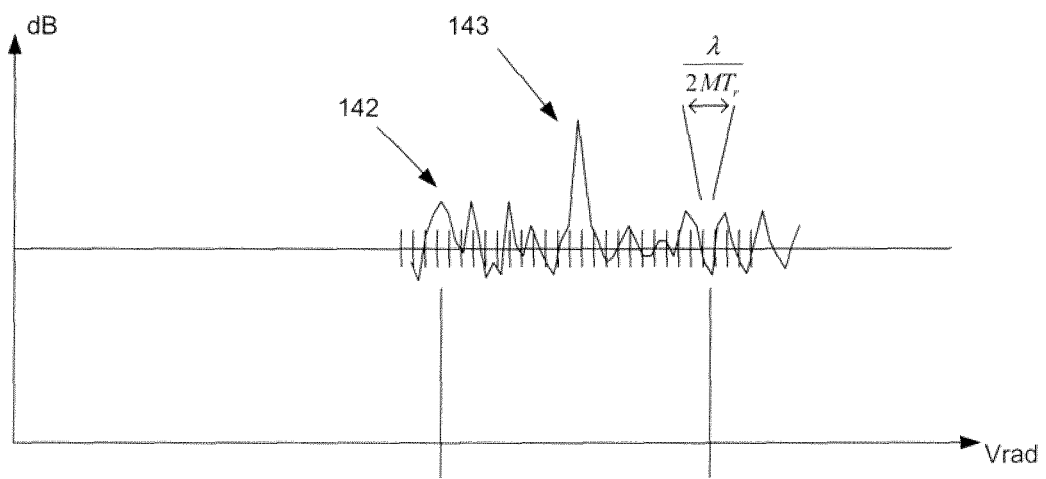

FIG. 14 illustrates the effect of this "long time" filtering for a distance d relative to the FTT velocity processing over a "short time" illustrated in FIG. 13 as used in the state of the art. In these two figures, the noise is shown by two zones 132 and 142. The clutter 131 appearing in FIG. 13 is eliminated in FIG. 14, and a concealed target 143 then appears, surrounded by noise 142.

According to an exemplary embodiment, the radial velocity resolution used in the invention (FIG. 14) is much smaller than for the traditional "short time" velocity processing (m·Tr, FIG. 13), due to the time difference.

Step E42 is a step for estimating the noise for each distance-radial velocity cell of the processing zone ZT.

In some embodiments, this noise level is estimated by an oblique projection method identical to that used to create the filters in step P5:

$$NB(d, Vrad) = MDT^{T*}(d) \cdot Porth(d) \cdot MDT(d)^{T} - MDV(d, Vrad) \quad \text{(eq. 12)}$$

This estimate of the noise level for a given distance radial velocity only uses the distance profiles MDT(d) collected at that distance.

During a step E43, the device 10, according to an exemplary embodiment, computes the signal-to-noise energy ratio RSB on the distance-radial velocity d, Vrad cell.

$$RSB(d, Vrad) = \frac{MDV(d, Vrad)}{NB(d, Vrad)} \quad \text{(eq. 13)}$$

During the same step E43, the device 10 may perform the detection in the sense of processing of the signal by comparing said ratio RSB to a threshold, a target being detected when the ratio RSB exceeds that threshold. The detection may be performed in a different step in other embodiments.

The detection threshold may be set from the probability of false alarms desired by the system and the number of strong reflectors to be eliminated per distance cell. This detector may be called "zero-forcing matched subspace detector." It is adapted to the use of oblique projection filters as used in these embodiments.

In other embodiments, the steps E42 for estimating the noise level and step E43 for detection are done according to the state of the art using a CFAR detector. In particular, this detector may be applied when the filter created in P5 is an orthogonal projection, followed by a correlation.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Machine-readable media may be non-transitory. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A method implemented in a mobile system comprising a radar for detecting, in a scene, at least one target reflector of a first predetermined type, called target type, that may be concealed by at least one high-energy reflector of a second type, called strong type, said method comprising:
   a step for identifying a zone of a distance-radial velocity space that includes high-energy reflectors configured to conceal the target reflectors;
   a step for modeling an order two phase shift over time, due to the Doppler effect, of theoretical reflectors of said target type and theoretical reflectors of said strong type, the modeling using a kinematic signature of said theoretical reflectors;
   a step for creating a filter for at least one distance and one radial velocity given by:
       a phase shift of a theoretical target reflector at the at least one distance and for the one radial velocity; and
       a phase shift of a theoretical strong reflector at the at least one distance and for each radial velocities of the zone;
   said phase shifts being obtained from the aforementioned step for modeling,
   said filter being designed to attenuate, by projection, the energy of the high-energy reflectors of said scene and increase, by correlation, the energy of said at least one target reflector of the scene at the given distance and for the given radial velocity;
   a step for illuminating the scene, by controlling the radar, and acquiring raw radar data from echoes reflected by the reflectors of the scene;
   a step for obtaining distance profiles obtained by processing raw radar data to separate the reflectors of the scene in terms of distance, said profiles being collected over a long enough time for the distance variation of a reflector of the scene to be able to be considered quadratic relative to the time;
   a step for applying filters on said distance profiles, this step leading to a separation of the reflectors of the scene in velocity; and
   a step for detecting the target reflectors among the high-energy reflectors.

2. The method according to claim 1, wherein said filter is an oblique projector.

3. The method according to claim 1, wherein said identification step comprises:
   a step for building a distance-radial velocity cartograph resulting from the raw radar data observed during a short time; and
   a step for analyzing the distance-radial velocity cartograph.

4. The method according to claim 1, wherein the step for identifying the zone in the distance-radial velocity space is performed from a priori knowledge of the observation geometry, of the antenna diagram of said radar and of the characteristics of the flight of the system.

5. The method according to claim 1, wherein said step for obtaining the distance profiles comprises a processing for compensating the distance migration of the reflectors over a long time.

6. The method according to claim 1, wherein the detection step uses a detector of the CFAR type.

7. The method according to claim 1, wherein the step for detecting the target reflectors and estimating the noise level, for a distance-radial velocity cell, uses only said collector distance profiles, at that distance.

8. The method according to claim 1, wherein said step for illuminating the scene uses a waveform of the FMCW type.

9. The method according to claim 1, wherein said kinematic signature of said target reflectors is defined by a zero orthoradial velocity.

10. The detection method according to claim 1, wherein said steps for identifying zones and for creating filters are performed before, after, or in parallel with steps for acquiring raw radar data and for obtaining distance profiles.

11. A tangible non-transitory computer-readable storage medium having machine instructions stored thereon, the instructions being executable by a processing circuit to cause the processing circuit to perform operations comprising:
- identifying a zone of a distance-radial velocity space that includes a plurality of high-energy reflectors, wherein at least one high-energy reflector conceals at least one target reflector;
- modeling an order two phase shift over time, due to the Doppler effect, of theoretical reflectors of said target type and theoretical reflectors of said strong type, the modeling using a kinematic signature of said theoretical reflectors;
- creating a filter for at least one distance and one radial velocity based on:
  - a phase shift of a theoretical target reflector at the at least one distance and for the one radial velocity; and
  - a phase shift of a theoretical strong reflector at the at least one distance and for each radial velocities of the zone;
- wherein the phase shifts are obtained from the modeling,
- wherein the filter attenuates, by projection, the energy of the high-energy reflectors of said scene and increases, by correlation, the energy of said at least one target reflector of the scene at the given distance and for the given radial velocity;
- illuminating the scene, by controlling the radar, and acquiring raw radar data from echoes reflected by the reflectors of the scene;
- obtaining distance profiles obtained by processing raw radar data to separate the reflectors of the scene in terms of distance, said profiles being collected over a long enough time for the distance variation of a reflector of the scene to be able to be considered quadratic relative to the time;
- applying filters on said distance profiles, this step leading to a separation of the reflectors of the scene in velocity; and
- detecting, in the scene, at least one target reflector from among the plurality of high-energy reflectors.

12. A device incorporated in a mobile system to detect, in a scene, at least one target reflector of a first predetermined type, called target type, that may be concealed by at least one high-energy reflector of a second type, called strong type, said mobile system comprising:
- a radar configured to illuminate the scene and acquire raw radar data from echoes reflected by the reflectors of the scene;
- means for identifying a zone of a distance-radial velocity space that includes high-energy reflectors configured to conceal the target reflectors;
- means for modeling an order two phase shift over time, due to the Doppler effect, of theoretical target reflectors and theoretical strong reflectors, the modeling using a kinematic signature of at least one theoretical reflector;
- means for creating a filter for at least one distance and one radial velocity given by:
  - the phase shift of a theoretical target reflector at the at least one distance and for the one radial velocity; and
  - the phase shift of a theoretical strong reflector at the at least one distance and for each radial velocities of the zone;
- said phase shifts being obtained from the modeling,
- said filter being designed to attenuate, by projection, the energy of the high-energy reflectors of said scene and increase, by correlation, the energy of said at least one target reflector of the scene at the given distance and for the given radial velocity;
- means for obtaining distance profiles obtained by processing raw radar data to separate the reflectors of the scene in terms of distance, said profiles being collected over a long enough time for the distance variation of a reflector of the scene to be able to be considered quadratic relative to the time;
- means for applying filters on said distance profiles, this step leading to a separation of the reflectors of the scene in velocity; and
- means for detecting the target reflectors among the high-energy reflectors.

* * * * *